United States Patent [19]
Mellitz

[11] Patent Number: 5,990,721
[45] Date of Patent: Nov. 23, 1999

[54] HIGH-SPEED SYNCHRONOUS CLOCK GENERATED BY STANDING WAVE

[75] Inventor: Richard I. Mellitz, Irmo, S.C.

[73] Assignee: NCR Corporation, Dayton, Ohio

[21] Appl. No.: 08/914,608

[22] Filed: Aug. 18, 1997

[51] Int. Cl.[6] .................................................. H03K 1/04
[52] U.S. Cl. .................... 327/292; 327/262; 327/268; 327/271; 327/295; 331/55
[58] Field of Search .......................... 331/55, 49; 333/20; 307/1; 340/310.01; 327/262, 268, 271, 292, 295, 14

[56] References Cited

U.S. PATENT DOCUMENTS

| | | | |
|---|---|---|---|
| 4,755,704 | 7/1988 | Flora et al. ............................. | 307/269 |
| 4,812,689 | 3/1989 | Whiteley ................................. | 307/605 |
| 4,855,998 | 8/1989 | Kishimoto ............................... | 370/86 |
| 5,369,640 | 11/1994 | Watson et al. .......................... | 371/1 |
| 5,416,861 | 5/1995 | Koh et al. ............................... | 385/14 |
| 5,517,532 | 5/1996 | Reymond ................................. | 327/141 |
| 5,635,877 | 6/1997 | Monk et al. ............................. | 331/55 |
| 5,640,112 | 6/1997 | Goto et al. .............................. | 327/141 |
| 5,652,548 | 7/1997 | Lee et al. ................................. | 331/55 |
| 5,656,963 | 8/1997 | Masleid et al. ......................... | 327/292 |

*Primary Examiner*—Margaret R. Wambach
*Attorney, Agent, or Firm*—Gregory A. Welte

[57] ABSTRACT

A clock for digital devices. Ordinarily, when multiple digital devices are clocked by a common clock, the clock signals frequently arrive at the digital devices at different times, due to propagation delays. The devices are thus not clocked synchronously. Under the invention, the multiple devices are connected to a common transmission line. A standing wave is generated on the transmission line, and the periodic collapse of the standing wave is used to clock the devices. Synchronous clocking to within about 1.0 nano-seconds has been attained, in a transmission line about ten feet long, wherein a clock signal ordinarily takes about 15 nanoseconds to travel from one end to the other.

18 Claims, 17 Drawing Sheets

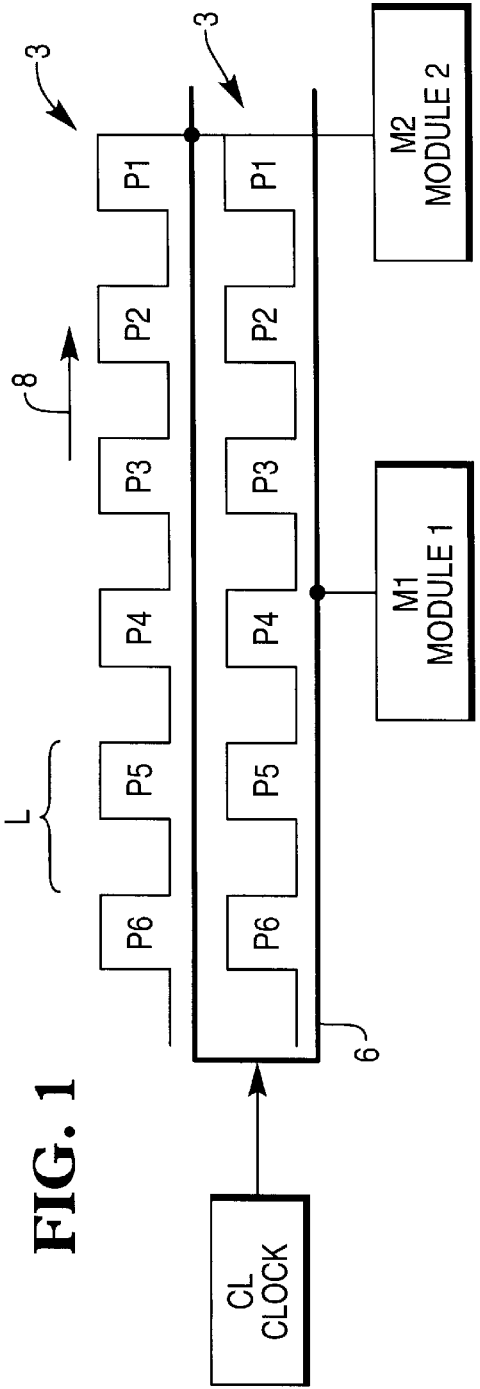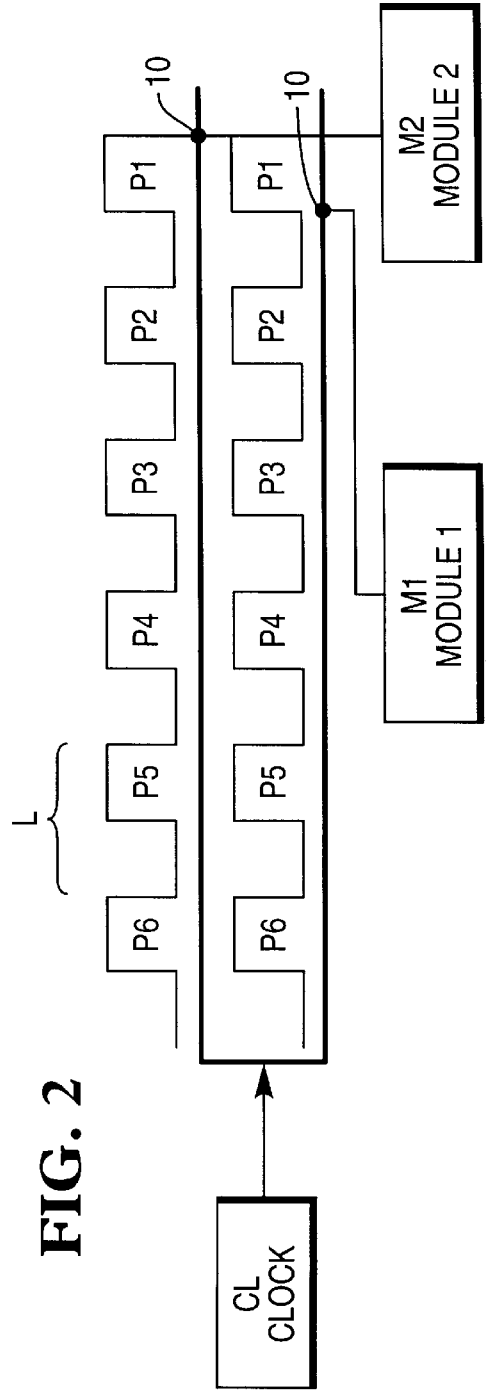

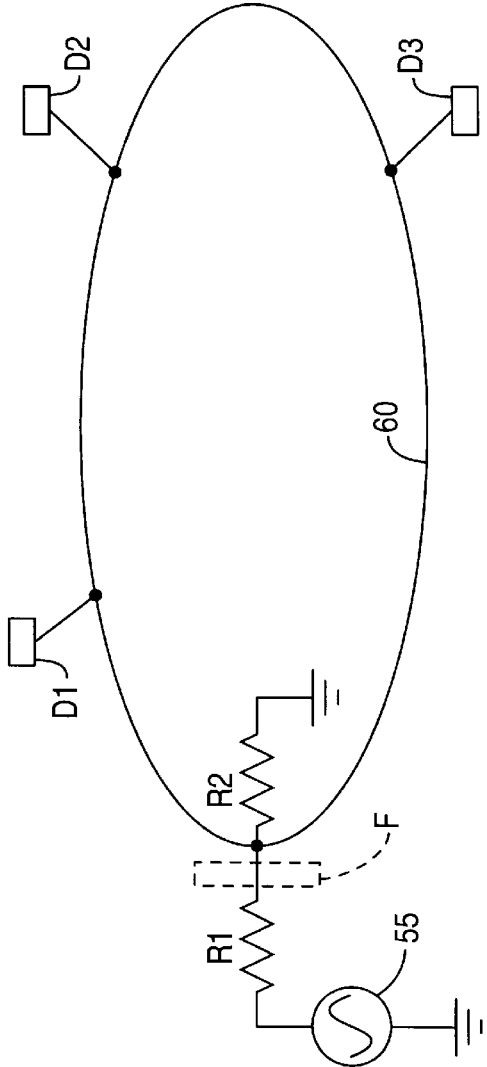
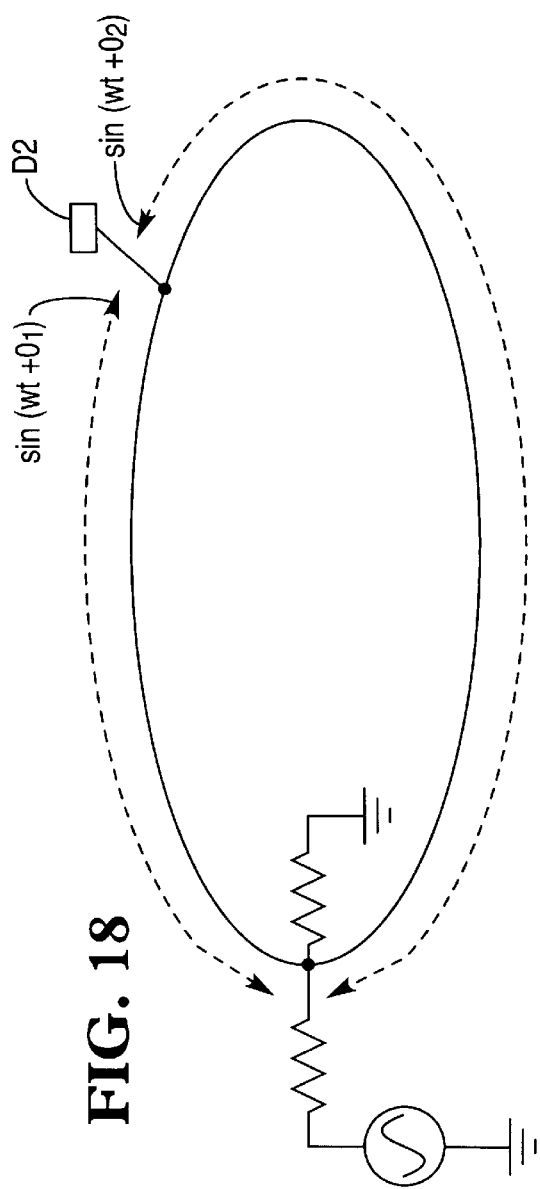

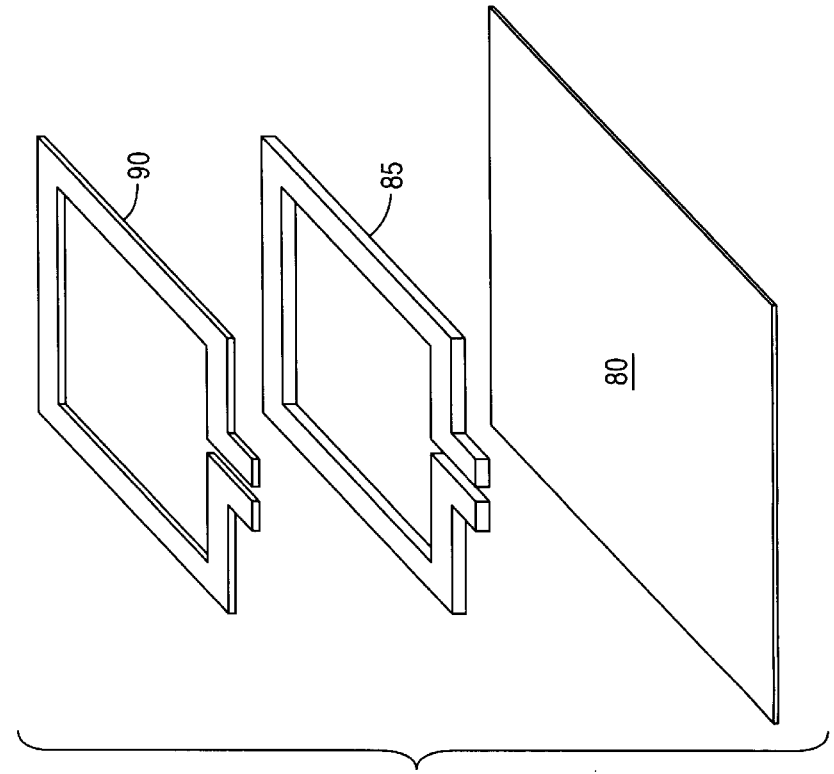
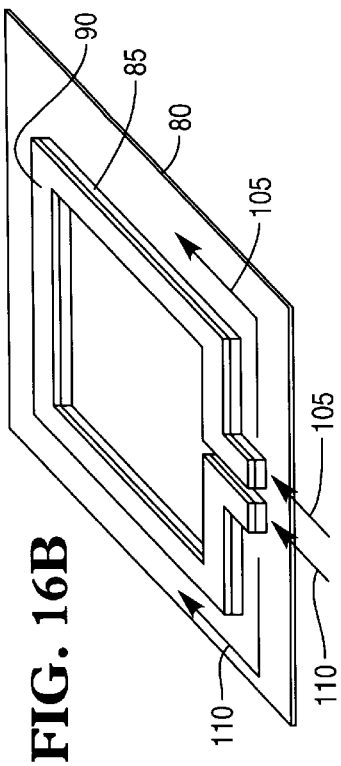
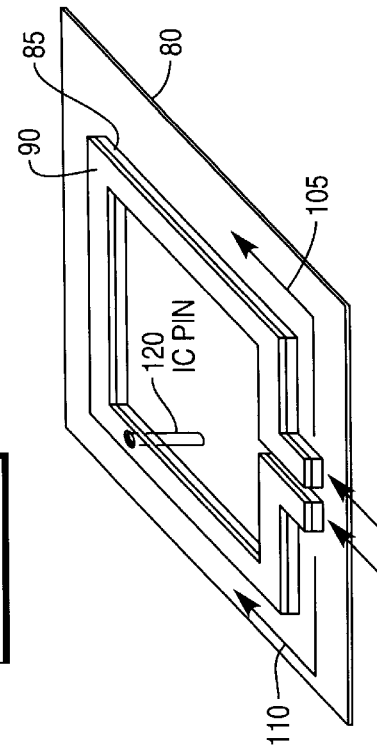
FIG. 16

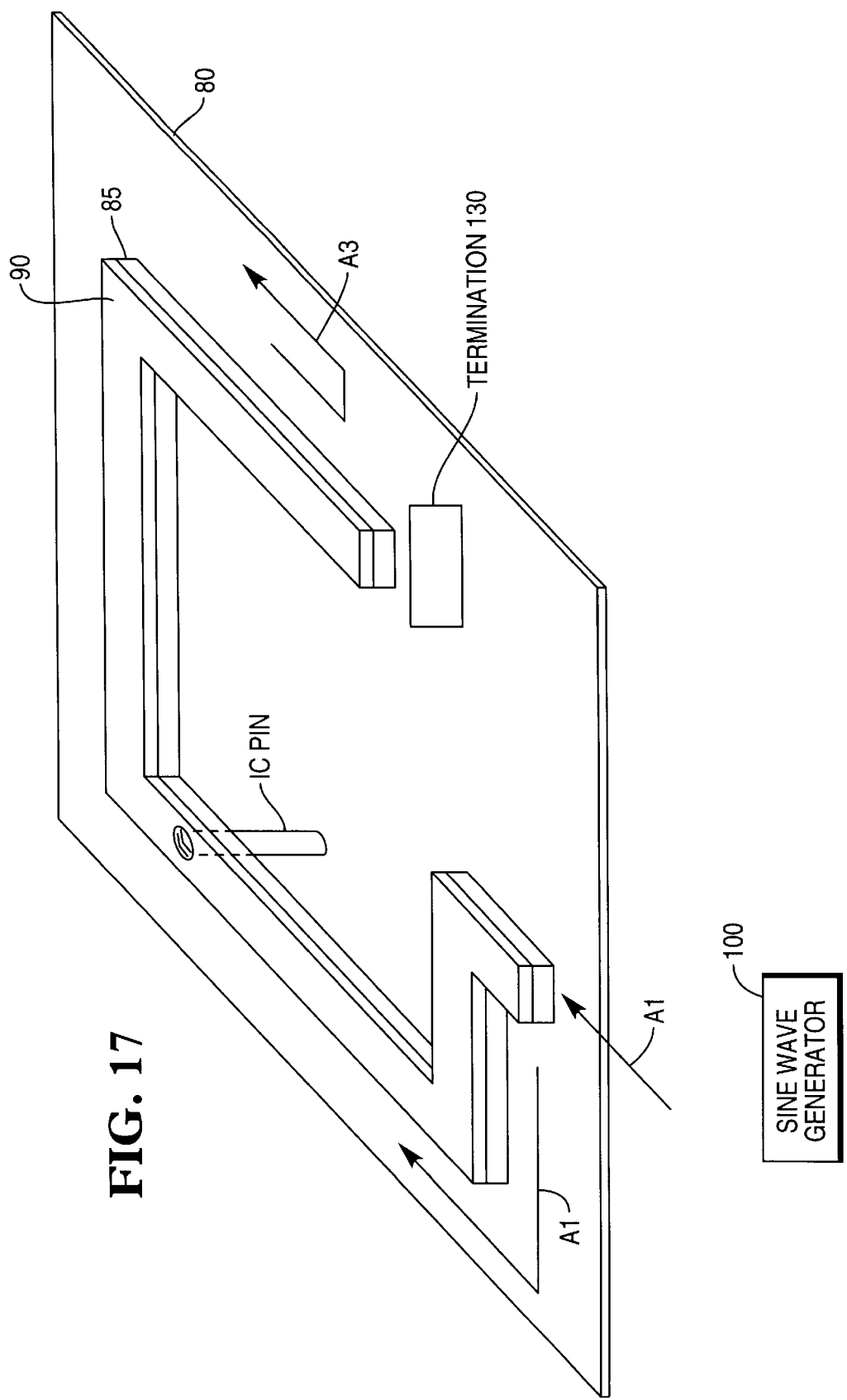

HIGH-SPEED SYNCHRONOUS CLOCK GENERATED BY STANDING WAVE

The invention concerns a clocking system, used for clocking digital circuits, in which the periodic collapse and expansion of a sinusoidal standing wave is used as a clock signal.

BACKGROUND OF THE INVENTION

One factor which limits the speed of operation of computers is the requirement of delivering synchronous clock signals to modules which are physically separated. For example, it is often required that two modules M1 and M2 in FIG. 1 receive synchronous clock signals 3 from a clock CL. Clock CL delivers the clock signals 3 to a branched transmission line 6, and they travel in the direction of arrow 8.

One way to make the clock signals synchronous is to assure that they arrive at M1 and M2 simultaneously, by locating modules M1 and M2 equidistant from clock CL. (FIG. 1 does not show this.) However, in the general case, equal distances cannot be attained, for practical reasons.

When the distances are not equal, the situation shown in FIG. 1 can occur. When clock pulse P1 reaches module M2, a later pulse P4 reaches module M1. This represents non-synchronous operation, because, at any given time, the modules respond to different clock pulses. Module M1 operates four clock cycles ahead of module M2.

To attain synchronous operation, the modules can be positioned as shown in FIG. 2, wherein their pick-off points 10 are ½ wavelength apart, or less. With this positioning, the situation will never arise wherein one pulse, such as P1, triggers module M2 while a later pulse, such as P2, triggers module M1.

In actual practice, the modules are frequently spaced closer, at $\frac{1}{10}$ wavelength. The physical distance which this $\frac{1}{10}$ wavelength spacing represents will now be estimated. As a rough estimate, signal travel on both printed circuit boards (PCBs) and integrated circuits (ICs) is in the range of one-half the speed of light. A rule-of-thumb for the speed of light is one foot per nano-second, so that a clock pulse, in a PCB or IC, takes about two nano-seconds to travel one foot.

If the wavelength of the clock pulse is one foot, then one wavelength occurs every 2 nano-seconds. The frequency is then $1/(2\times10^{-9})$, or $5\times10^8$ Hz, which is 0.5 Giga-Hertz, GHz. One-tenth of this one-foot wavelength is 1.2 inches.

Thus, under the $\frac{1}{10}$ wavelength limitation, the maximum separation between modules M1 and M2 allowed by a clock running at 0.5 GHz would be 1.2 inches. For other clock frequencies and other signal velocities, the limits on separation are computed in the same way. In general, as clock frequencies increase, the separation between modules receiving the same clock signals must be reduced. This reduction creates problems in the design of digital circuitry, because, in general, designers wish to avoid constraints on the positioning of modules such as M1 and M2.

OBJECTS OF THE INVENTION

An object of the invention is to provide high-speed synchronous clocks to multiple digital devices.

SUMMARY OF THE INVENTION

In one form of the invention, a standing wave is used to clock digital circuitry located at various positions along the wave.

BRIEF DESCRIPTION OF THE DRAWINGS

FIG. 1 illustrates two modules being clocked by different clock pulses.

FIG. 2 illustrates positioning the modules of FIG. 1 sufficiently closely to assure that they are clocked by the same clock pulse.

FIG. 15 illustrates detectors D1–D3 used with the apparatus of FIG. 14. FIGS. 16A, 16B, and 16C illustrate another form of the invention. FIG. 17 illustrates another form of the invention.

FIG. 18 illustrates two mathematical expressions, used to provide an analytical description of the standing wave at any location.

DETAILED DESCRIPTION OF THE INVENTION

This discussion will first explain how certain types of standing waves are created, and then explain how a generalized standing wave can be used as a clock signal.

First, expression (4), below, will be justified. Expression (4) is a classical equation for an electromagnetic wave reflected from a perfect conductor. The reader may wish to jump to expression (4) directly, because the justification to be given is known in the art, and is available in many textbooks.

Figure 3:
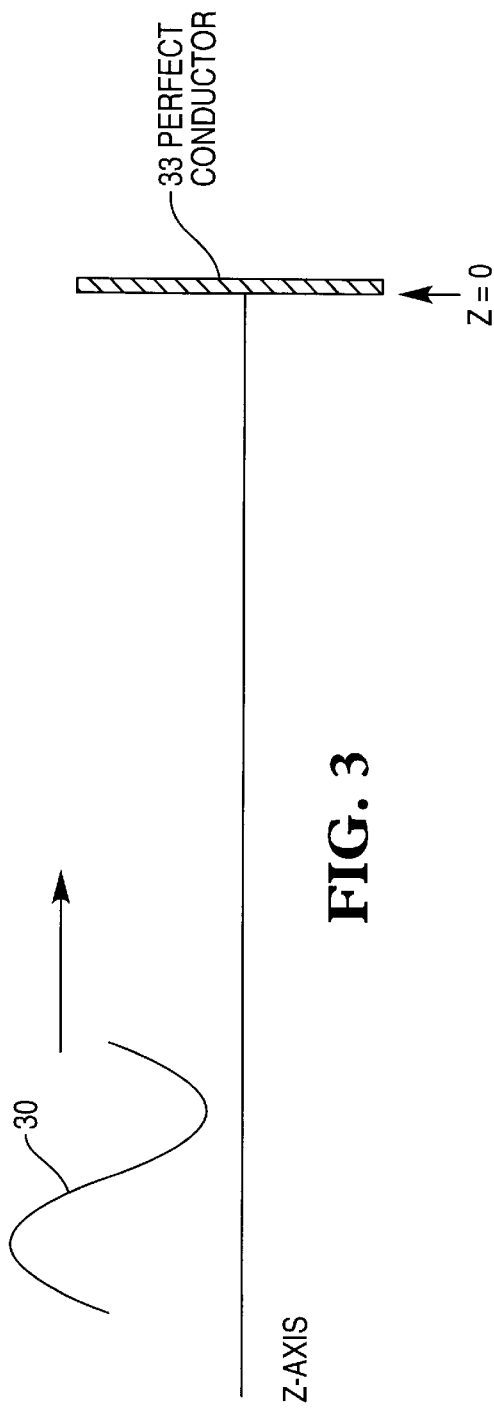
FIG. 3 illustrates one cycle 30 of a wave approaching a perfect conductor 33.

FIG. 3 shows one cycle 30 of an electromagnetic wave approaching a perfect conductor 33. The electric field (not shown) of wave 30 is represented in phasor form as $E^+e^{-jkz}$, wherein:

"k" is the propagation constant,

"z" represents distance from the point z=0,

"j" is the imaginary operator, and the "+"superscript of "E" means that the wave travels to the right.

Figure 4:
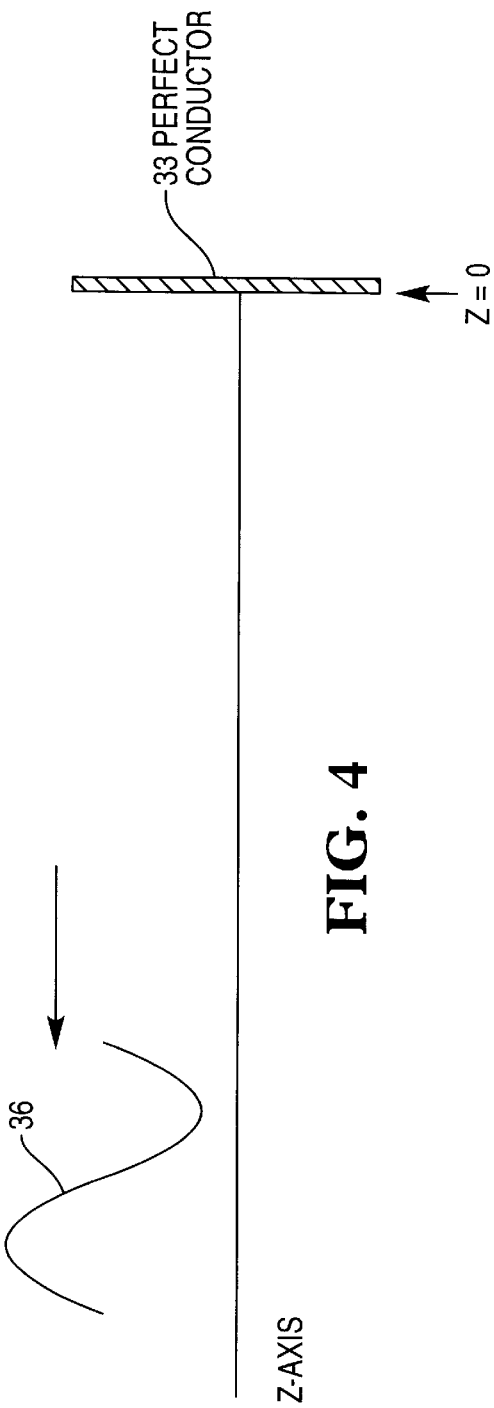
FIG. 4 illustrates one cycle 36 of a wave reflected from the perfect conductor.

FIG. 4 shows one cycle of reflected wave 36, which travels away from the perfect conductor 33. The electric field of that wave is represented as $E^{31} e^{+jkz}$, wherein the "−" superscript of "E" indicates that the wave travels to the left.

Assume that the distance to the left of the perfect conductor 33 is infinitely long, so that no additional reflections of the reflected wave 36 occur. That is, the only waves present are waves 30 and 36.

At the reflection point on the perfect conductor 33, the total electric field must be zero. Thus, at the point z=0, the incoming and reflected waves must sum to zero, as the following expression indicates:

$$^+e^{-jk0}+E-e^{+jk0}=0. \qquad (1)$$

Since the zeroes in the exponents cause the exponential terms to both equal unity, this expression indicates that $E^-=-E^+$.

To the left of the perfect conductor, the total electric field is the sum of the approaching wave and the reflected wave:

$$E_{tot}=E^+e^{-jkz}+E^-e^{+jkz}. \quad (2)$$

Using the fact, just shown, that $E^-=-E^+$, this expression can be re-written as:

$$E_{tot}=E^+e^{jkz}-E^+e^{+jkz}=E^+(e^{-jkz}-e^{+jkz})=-2jE^+ \sin kz. \quad (3)$$

This expression is the sinusoidal, steady-state, phasor representation of the electric field to the left of the perfect conductor. To obtain the instantaneous time-domain representation, that expression is multiplied by $e^{jwt}$, wherein w is angular frequency and t is time, and then the real part is taken, to produce the expression (4), as promised above:

$$E_{tot}(z,t)=Re[(-2jE^+ \sin kz)e^{jwt}]=2E^+(\sin kz)(\sin wt). \quad (4)$$

While the preceding derivation was made in the context of an electromagnetic wave, it also applies to reflections on a transmission line. This derivation can be found in many textbooks on electromagnetic wave propagation or transmission line theory. One example of the former is *Fields and Waves in Communication Electronics*, 3d ed., Ramo, Whinnery & Van Duzer (John Wiley, 1994) ISBN 0 471 58551 3, which is hereby incorporated by reference.

FIGS. 5–13 illustrate the time-behavior of the standing wave in graphical format, and were generated by the software package MATHEMATICA, available from Wolfram Research, Inc., Champaign, Ill. In each Figure, a wave labeled RIGHT is traveling to the right, a wave labeled LEFT is traveling to the left, and a wave labeled SUM is the algebraic sum of the LEFT and RIGHT wave.

Figure 5:
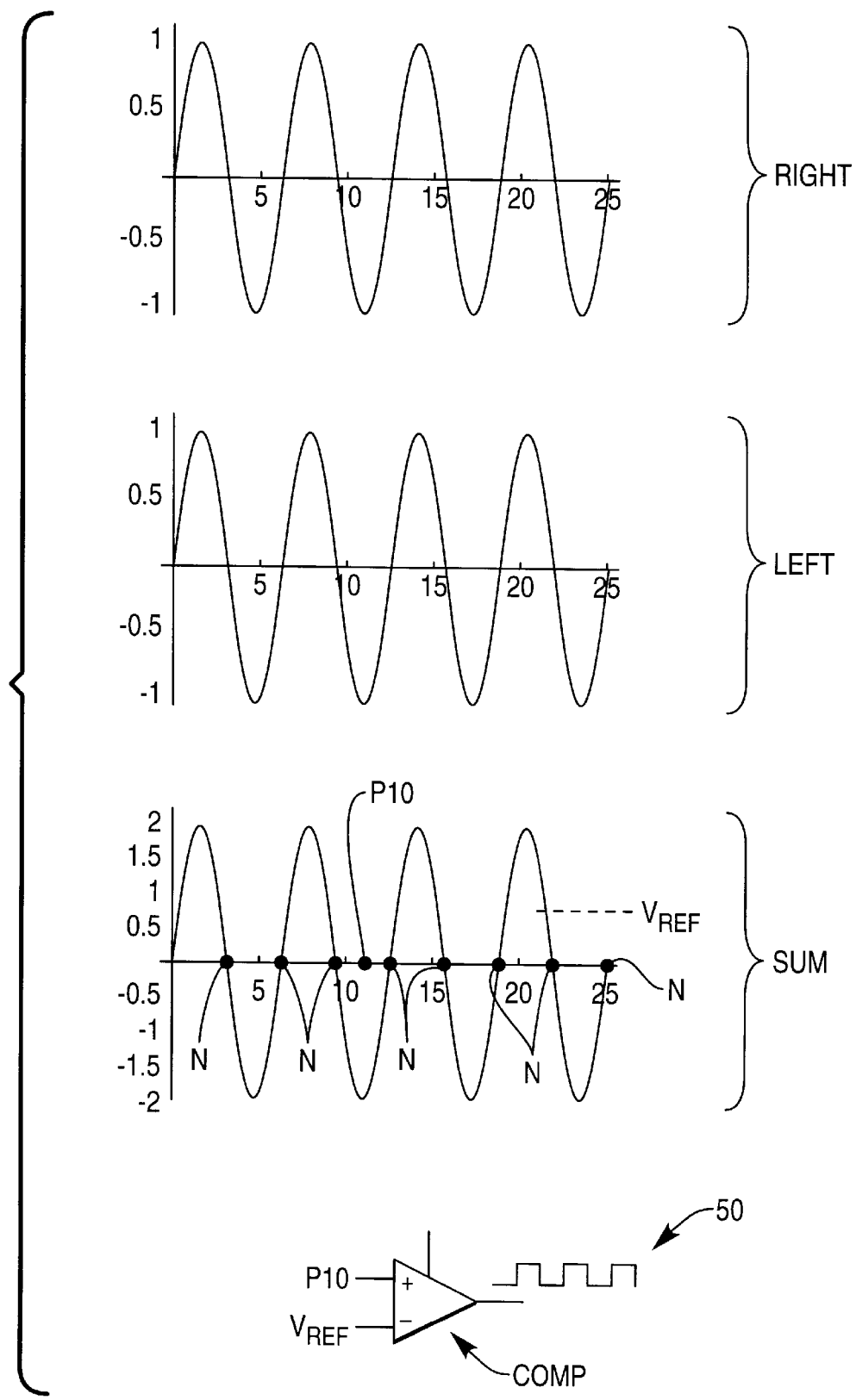
FIGS. 5–13 illustrate various stages of two oppositely traveling waves crossing each other, together with their SUM at each stage.
Figure 6:
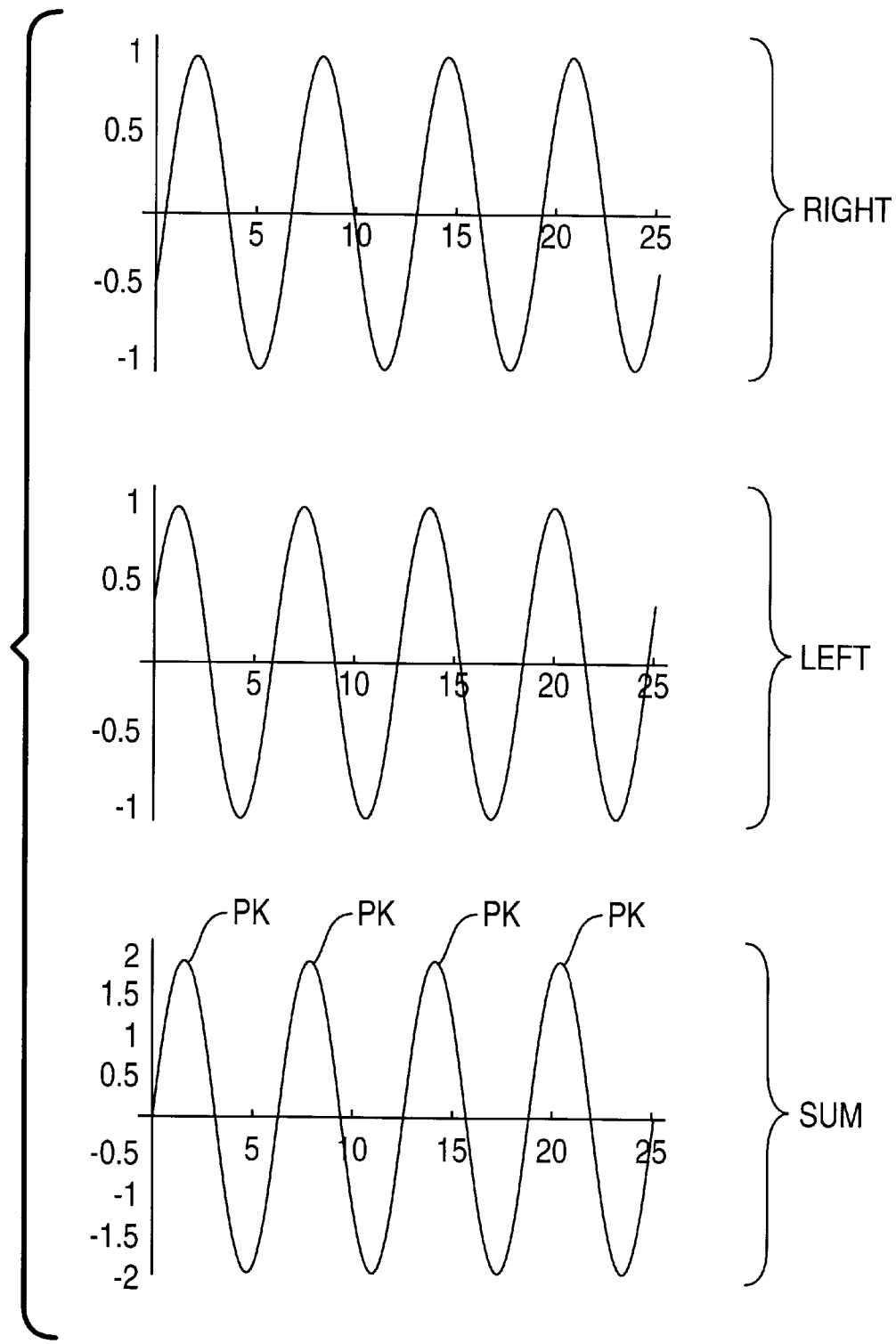
Figure 7:
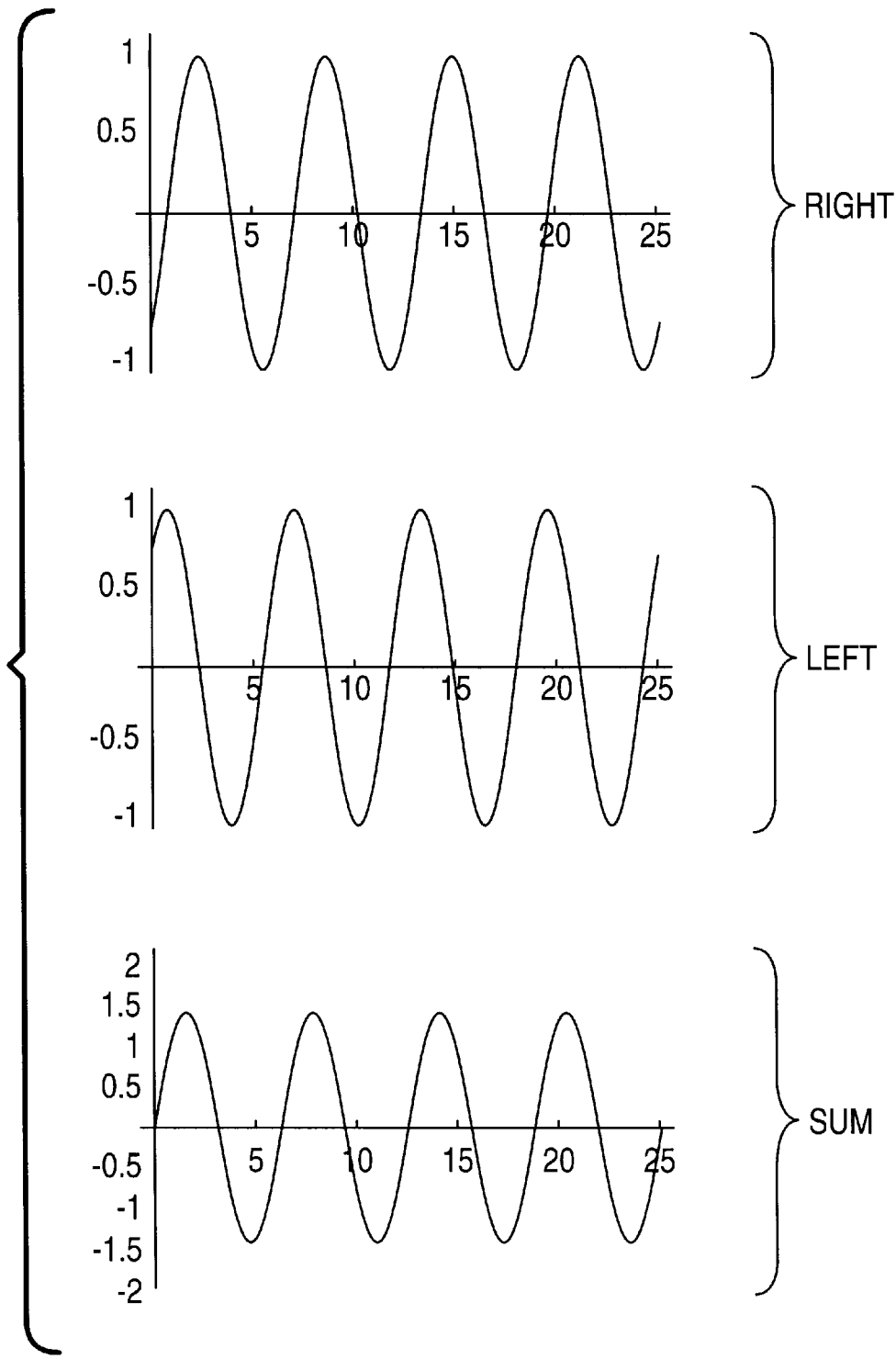
Figure 8:
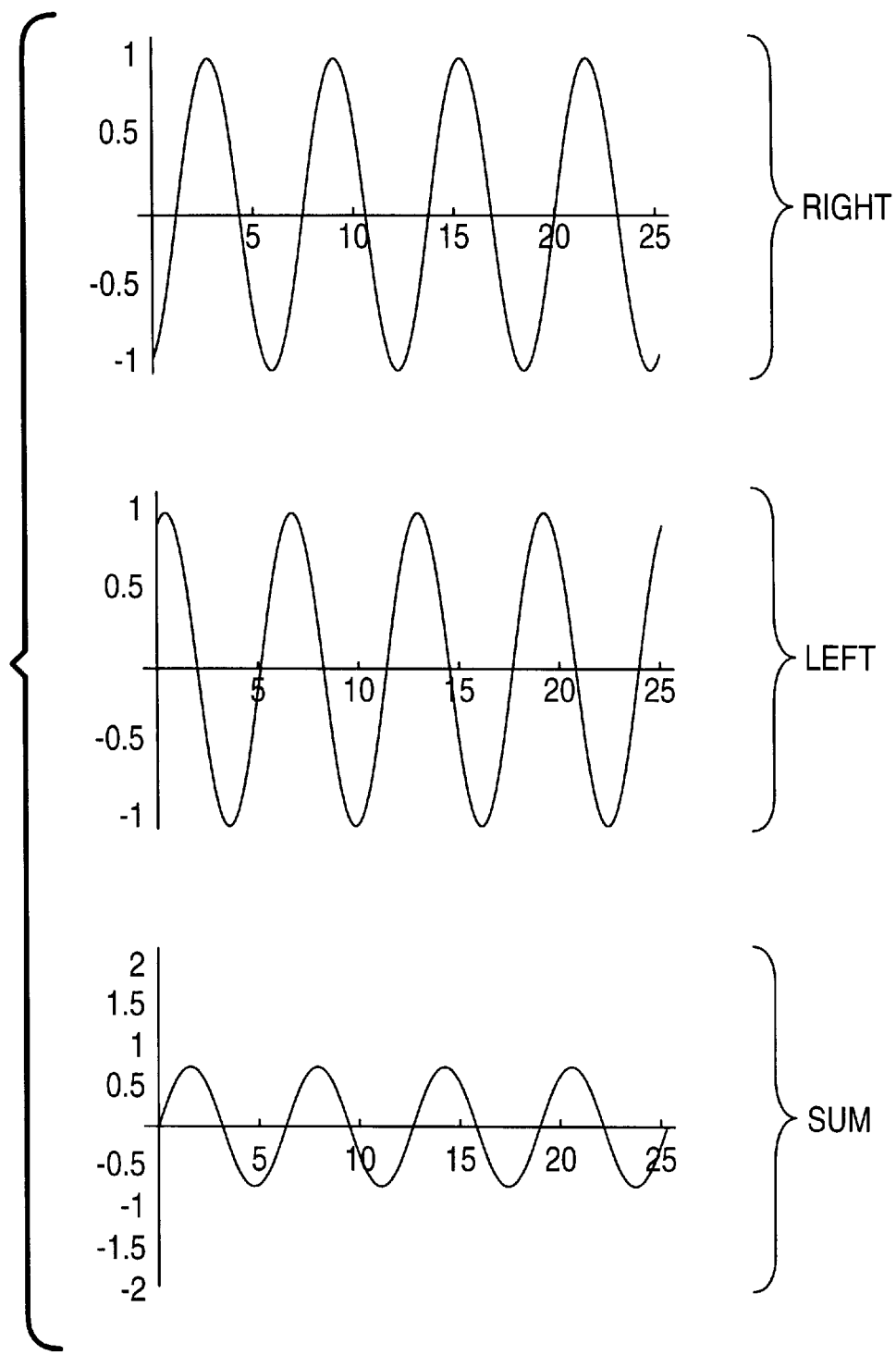
Figure 9:
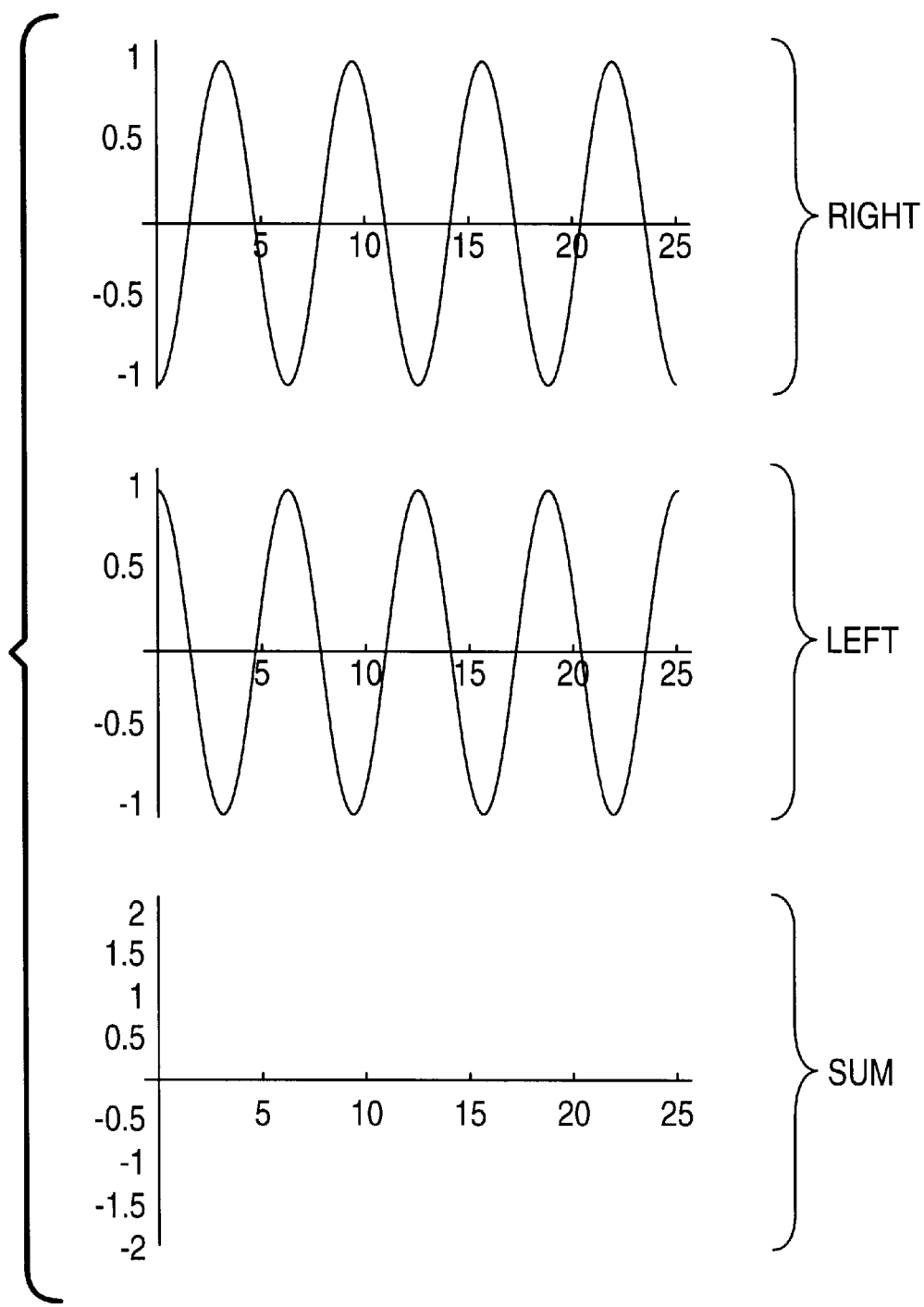
Figure 10:
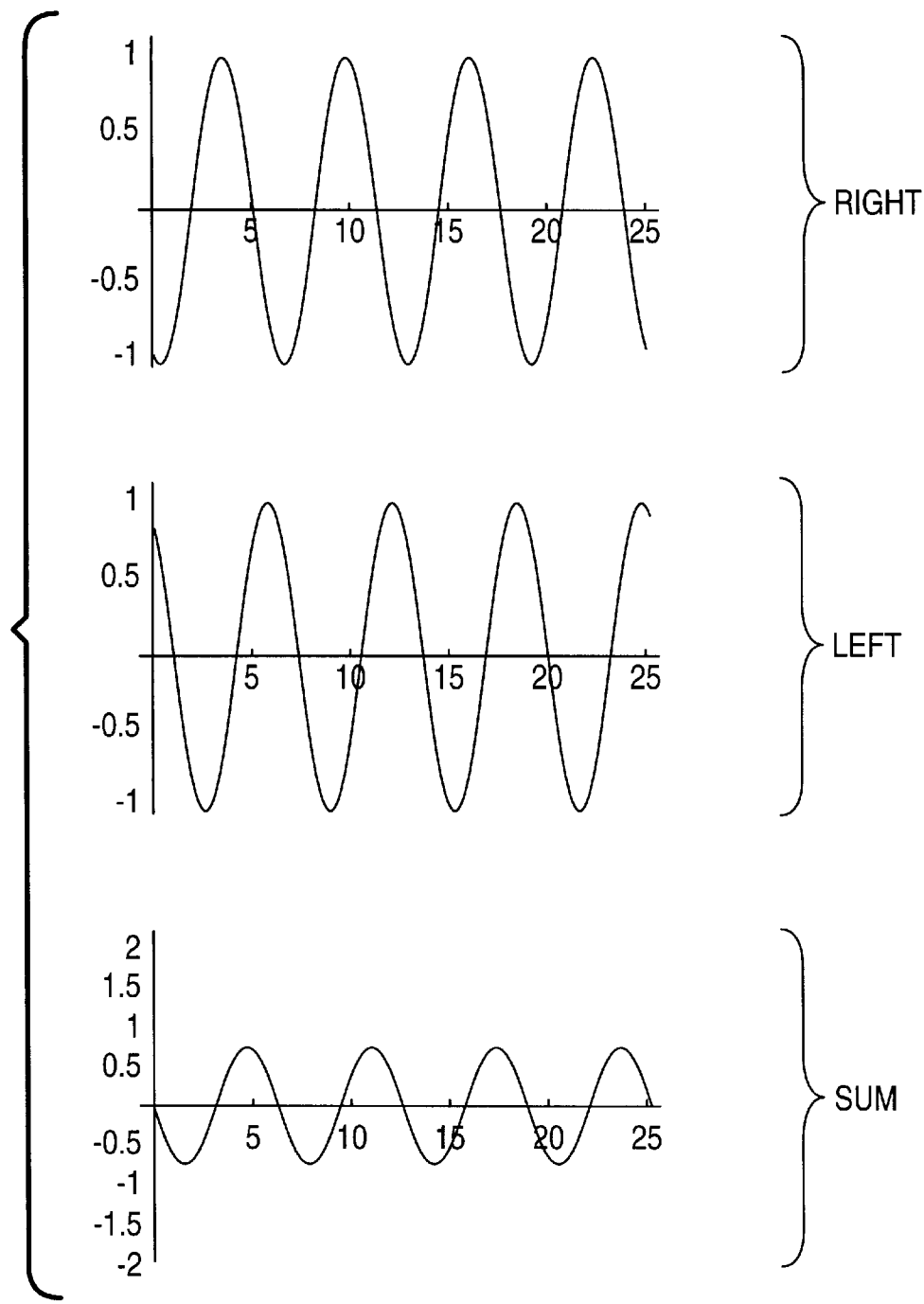
Figure 11:
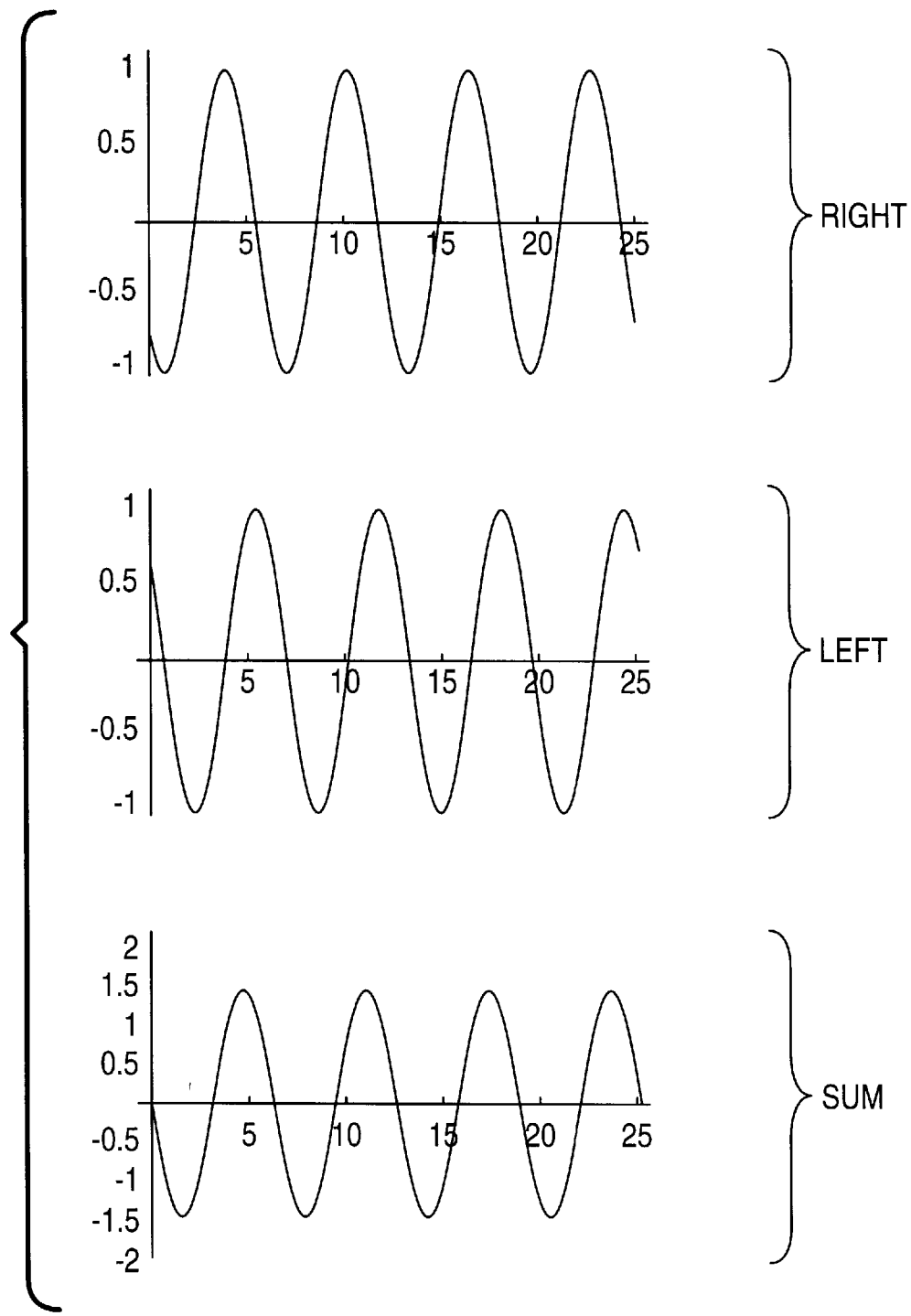
Figure 12:
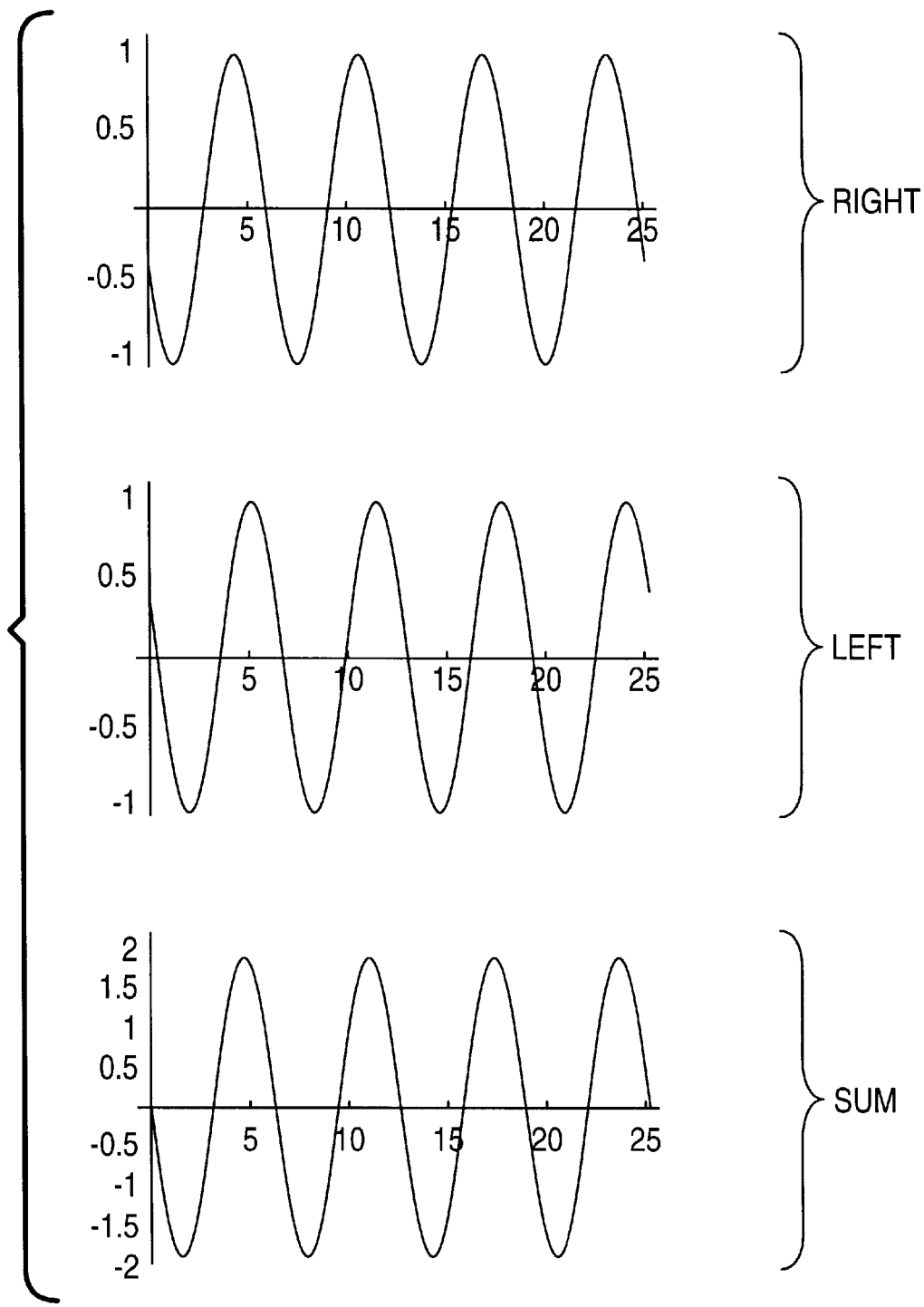
Figure 13:
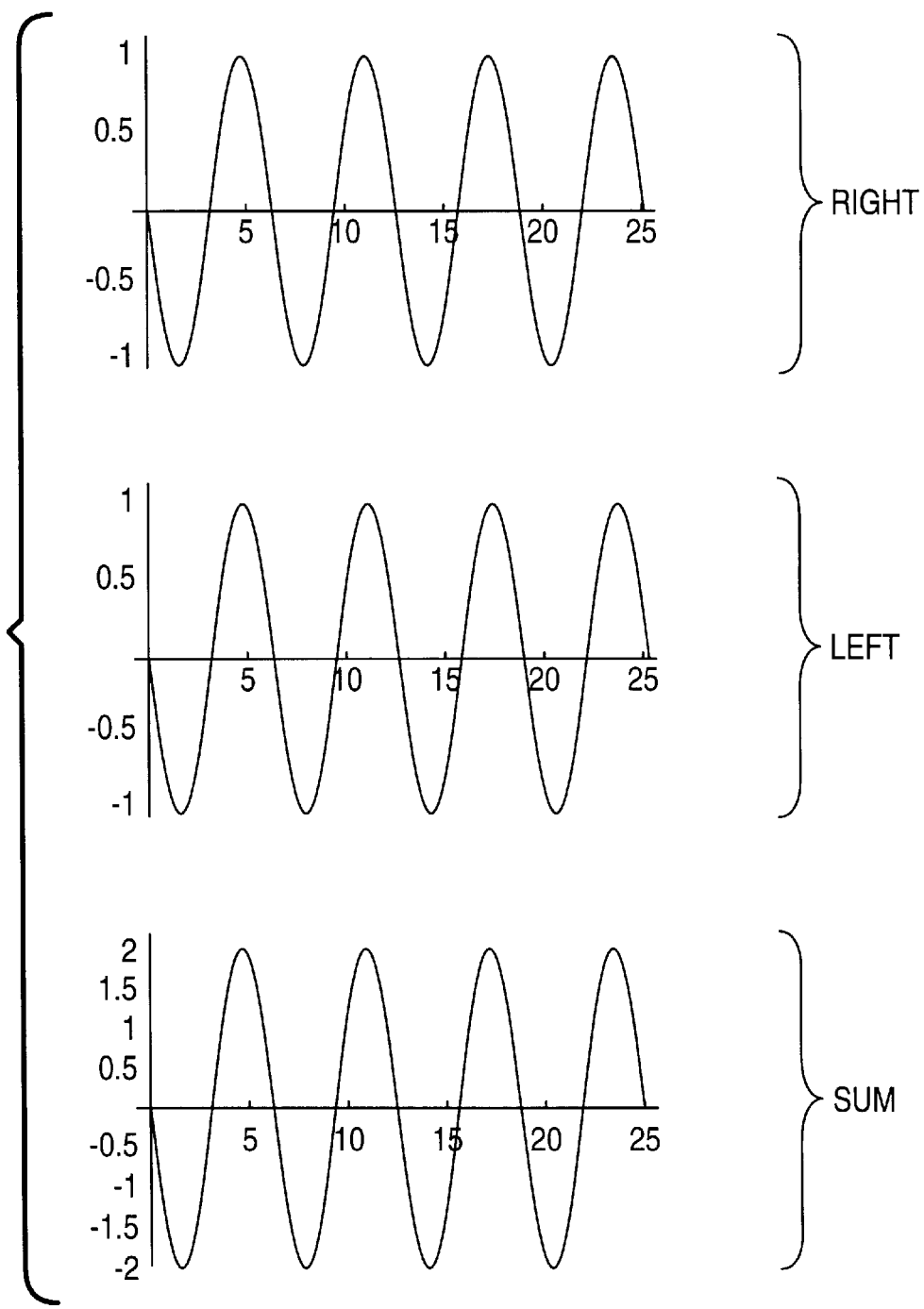

The sequence of the SUMs in the Figures illustrates the standing wave. The standing wave SUM is at its maximum value in FIG. 5. It is collapsing in FIGS. 6–8. It is zero in FIG. 9. In FIGS. 10–12, it is growing, but now as the negative of the waves in FIGS. 6–8. In FIG. 13 it reaches its negative maximum. Then, the sequence reverses: the standing wave SUM assumes the plots shown in FIG. 12, FIG. 11, ... FIG. 5. Then, the sequence repeats again, beginning with FIG. 5 through FIG. 13, and then from FIG. 13 through FIG. 5.

Three significant features of the standing wave are the following.

1. One is that the zero-points, or nodes, N in FIG. 5, remain fixed in space. The standing wave has a value of zero at these nodes N, at all times.

2. A second is that, between the nodes, the standing wave fluctuates between two extreme values, shown in FIGS. 5 and 13.

3. A third is that, as in FIG. 9, the standing wave periodically assumes a value of zero at all locations.

In one form of the invention, the standing wave is used as a clock. A detector is placed between nodes N in FIG. 5, such as at point P10. The detector can take the form of a level detector, indicated by the digital comparator COMP. The comparator COMP is fed two signals. One is a fixed voltage reference, Vref, whose value is indicated by the dashed line labeled "Vref" in the SUM plot. The other is the standing wave picked off at point P10.

Whenever the standing wave SUM exceeds Vref, a clock pulse occurs. Thus, the comparator COMP produces the pulse train 50. This pulse train 50 is of the same frequency as the waves LEFT and RIGHT, as will be demonstrated later.

Another form of detector (not shown) can be a zero-crossing detector. Zero-crossing detectors are known in the art, and respond either a positive-to-negative zero crossing of the SUM signal, or a negative-to-positive zero crossing, as determined by their design.

Figure 14:
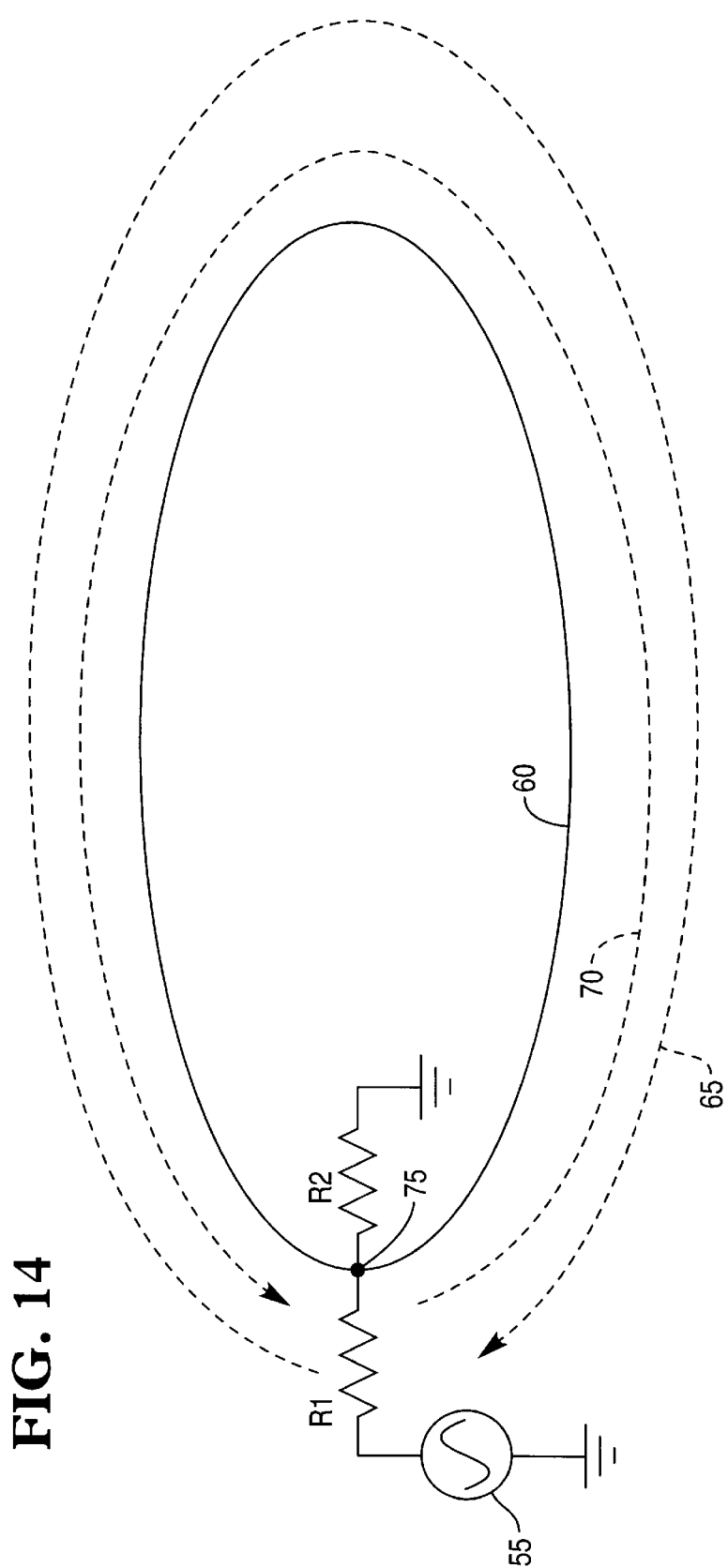
FIG. 14 illustrates one form of the invention.

FIG. 14 is a schematic of hardware which can implement one form of the invention. A sine wave generator 55 is connected to a loop 60 of coaxial cable, or other transmission line. The sine wave generator 55 creates two oppositely traveling sine waves, indicated by arrows 65 and 70.

Resistor R1 represents the source impedance of the sine wave generator 55, and resistor R2 is an external resistor, which is grounded. The values of the resistors R1 and R2 are chosen so that, after sine waves 65 and 70 traverse the loop 60 once, and return to point 75, no reflections occur. Under these conditions, only two oppositely traveling sine waves exist in the loop 60.

Of course, in some situations, a complex impedance may be required to suppress reflections. Thus, resistors R1 and R2 should be interpreted as generalized impedances.

Various detectors, such as D1, D2, and D3 in FIG. 15 are connected to the loop 60. They can be of the types described above. Each detector issues a clock signal, analogous to signal 50 in FIG. 5. The clock signal is used to trigger digital equipment (not shown).

FIG. 16 illustrates a particular embodiment, which can be implemented in an integrated circuit, or a printed circuit board. FIG. 16A is an exploded view, showing a conductive trace 90, a dielectric 85, and a ground plane 80.

FIG. 16B shows the components in assembled form, with a sine wave generator 100 added. The sine wave generator 40 launches two sine waves, indicated by arrows 105 and 110. These are oppositely traveling, as in the case of loop 60 in FIG. 15, and create a standing wave (not shown).

FIG. 16C shows an IC PIN 120. This pin 120 leads to an input of an integrated circuit (not shown) which contains a detector, such as one of the types identified above. The pin 120 does not contact the ground plane 80, but does contact the conductive trace 90. The pin 120 acts as a pick-off for the clock signal.

FIG. 17 illustrates another form of the invention, wherein the trace 90A is terminated by a TERMINATION 130. A single sine wave A1 is launched into the trace, and is reflected at the TERMINATION 130, as indicated by arrow A3. Preferably, the TERMINATION 130 acts as a short circuit, providing a standing wave as described by equation (4) above. TERMINATION 130 can also be an open circuit.

ALTERNATE EMBODIMENT

It is not necessary that a standing wave actually be generated. In fact, when a standing wave is used in some situations, the nodes N in FIG. 5 can shift in position, causing difficulty in picking off a clock signal. As a specific example, under some conditions, when an attempt is made to generate a standing wave, the result is a standing wave over which is superimposed a traveling wave, which causes shifts in the nodes N.

To solve this problem, two waves can be generated on two transmission lines. The wave on each transmission line is sampled, and then normalized to, in effect, cause the magnitude of the underlying sine waves to become identical. For example, assume both sine waves are 2.0 volts peak-to-peak when leaving their respective generators. However, the waves may travel different distances, so that one wave may be ½ the peak-to-peak voltage of the other, at the sampling locations. In this example, the normalization amplifies the former wave by 2, and leaves the larger wave alone. After normalization, the waves are added.

Figure 19:
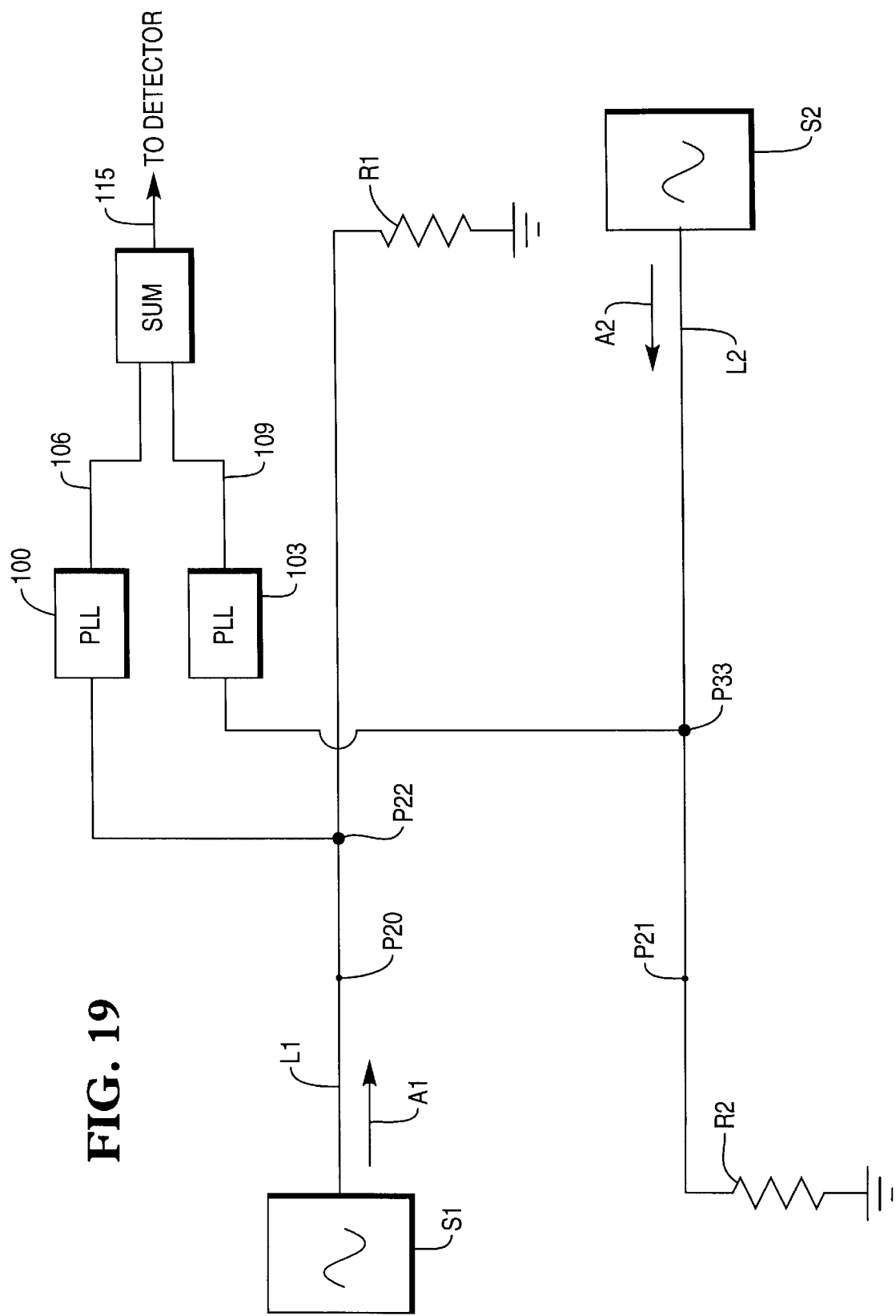
FIG. 19 illustrates one form of the invention. The PLLs contain automatic gain-control circuitry.

FIG. 19 illustrates an apparatus for accomplishing this process, wherein a sinusoidal signal generator S1 produces a sine wave traveling in the direction of arrow A1 on transmission line L1. Another sinusoidal signal generator S2 produces a sine wave traveling in the direction of arrow A2 on transmission line L2. Terminations R1 and R2 are impedance-matched with the lines L1 and L2 to suppress reflections. Thus, the only wave on line L1 is that traveling in the direction of arrow A1, and the only wave on line L2 is that traveling in the direction of arrow A2.

Analog Phase-Locked-Loops (PLLs) 100 and 102 pick off signals from the lines L1 and L2. Each PLL produces a sine wave which is in-phase (or in-phase within a known amount of error) with the sine wave sampled. Further, the sine waves produced by the PLLs are of the same magnitude, regardless of the magnitude of the sampled sine waves. Such PLLs are known in the art, and can use automatic gain control circuits to establish this equality in magnitude. An example will illustrate the significance of this feature.

Assume that signal generators S1 and S2 both produce signals of identical magnitude. The signal, from signal generator S1, reaching point P20 will be different in magnitude from that reaching point P21 from signal generator S2. The reason is that the points lie at different distances from their respective signal generators, and thus the signals will experience different attenuations over those different distances.

However, since the PLLs produce output signals, on lines 106 and 109, which are of identical magnitude (in the phasor sense) to each other, the difference in signal magnitude at points P20 and P21 does not matter. From another point of view, the PLLs merely extract phase information from the signals on lines L1 and L2. The PLLs ignore the magnitude information, and fabricate sine waves of identical magnitude, based on the phase information extracted.

The outputs of the PLLs are added in summer SUM. The output 115 of the summer SUM is, in effect, a standing wave, as if detected at a single point on a single transmission line. A significant feature is that the distances of sampling locations P22 and P23 from their respective signal sources S1 and S2 are not important, nor is the distance between P22 and P23. For example, P22 can be located many wavelengths from source S1, P23 can be located many wavelengths from source S2, and P22 and P23 can be separated from each other by many wavelengths.

(However, each pick-off point P22 and P23 contains two taps, which are not shown. Regarding point P22, one tap is connected to the "signal" line of transmission line L1, and one is connected to the "ground" line. Preferably, the two individual taps should be the same distance from the signal source S1.)

Figure 20:
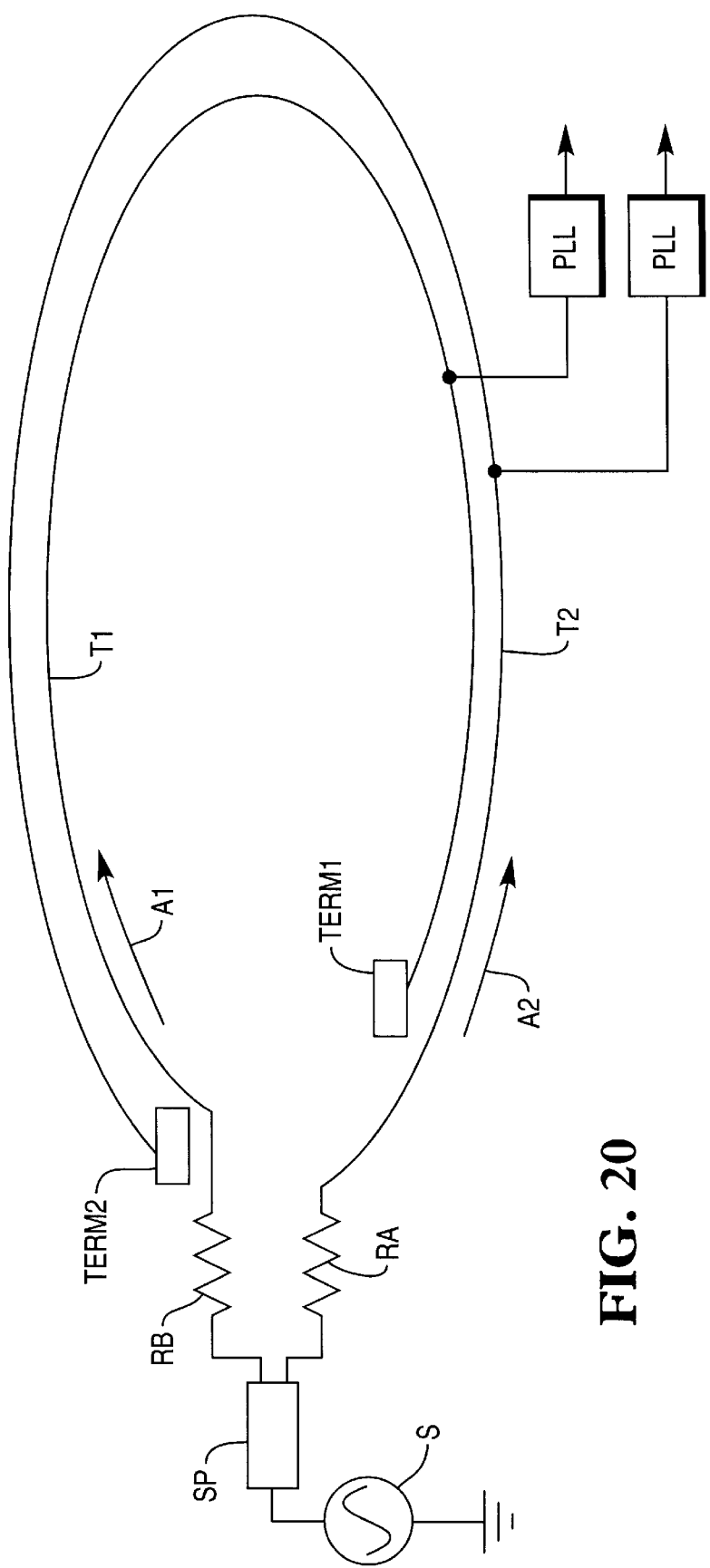
FIG. 20 illustrates a specific embodiment of the form of the invention shown in FIG. 19.

To implement this embodiment on an integrated circuit or printed circuit board, the apparatus of FIG. 20 can be used. A sinusoidal signal source S produces a signal which is split by a signal splitter SP, and delivered to transmission lines T1 and T2. Resistors RA and RB represent the source resistance of source S, seen by lines T1 and T2. Terminations TERM1 and TERM2 suppress reflections at the ends of the lines.

With this arrangement, only a single wave exists on line T1, traveling in direction A1, and only a single wave exists on line T2, traveling in direction A2. Phase-Locked-Loops PLL sample the waves, as described in connection with FIG. 19.

It should be observed that, in the case of FIG. 14, two oppositely traveling sine waves are generated on a single transmission line. However, in FIG. 19, the concept of opposite travel is not defined. That is, source S2 and resistor R2 can be switched as to position. In such a case, the wave on line L2 would travel in the "same" direction as that on line L1.

ADDITIONAL CONSIDERATIONS

1. Ordinary clock signals, such as a 100 MHz clock used in a computer, produce significant amounts of Electro-Magnetic Interference, EMI. One reason is that the clock signals are square waves. Square waves are composed, in theory, of an infinite Fourier Series of sinusoids, at integral multiples, or overtones, of the clock frequency. All of these overtones radiate energy.

In addition, the clock signals are relatively large in voltage, at one to five volts, approximately. These large voltages cause large current surges in the conductors carrying the clock signals. These currents cause radiation.

In contrast, the invention utilizes a single-frequency sinusoid, produced by sine wave generator 100 in FIG. 16. Overtones comparable to the square-wave clock signals are absent.

Further, the invention's sinusoid can be very small in magnitude. By analogy, a television signal, received by an ordinary television receiver, lies in the range of a few micro-volts. (One microvolt equals one-millionth of a volt.) These signals are easily detected, using known approaches.

The invention can use a similarly small sinusoid, to further reduce radiating currents. Specifically, selected values of the peak-to-peak voltage of the sine wave produced by sine wave generator 100 are 1–10 microvolts,
11–100 microvolts,
101–1,000 microvolts,
1–10 millivolt,
11–100 millivolt,
101–1,000 millivolts, or
1–10 volts.

2. The peaks PK in FIG. 6 rise and fall simultaneously. That is, once the standing wave SUM is established, all peaks PK rise and fall together, irrespective of their distances from the sine wave generator. This simultaneity allows very close synchronism of the detectors D in FIG. 15 to be attained.

In an experiment, a standing wave was generated in a loop of common coaxial cable, about 10 feet long, in the manner of FIG. 15. Twelve detectors were applied to the cable. The sine wave frequency was 150 MHz. It was found that the detectors were triggered simultaneously by the standing wave, within a few hundred pico-seconds, and certainly less than 1.0 nano-second, of each other.

To place these results in context, propagation velocity of signals in coaxial cables is about one foot of travel in 1.5 or 2.0 nano-seconds, as explained in the Background of the Invention. Assume a speed of one foot in 1.5 nano-seconds, and a clock connected to one end of a five-foot linear coaxial cable. (A length of five feet is chosen because that is the longest possible distance between a detector and the sine wave generator in a ten-foot loop, as used in the experiment.)

A detector located at the other end of the cable will receive a clock signal 6 nano-seconds later than a detector located one foot from the clock generator, because of the four-foot difference in travel by the clock signal. (4.0 ft×1.5 nS/ft.=6.0 nS.) In contrast, the experiment indicates that, with the standing wave, the time difference for detectors similarly spaced is 1.0 nano-second, or less, which is a significantly smaller time than 6 nanoseconds.

3. Expanding upon the previous point, the invention allows higher clock frequencies to be transmitted over distances not previously possible. For example, in 1997, the largest practical separation of modules M1 and M2 in FIG. 1 is about four feet, for a clock of 100 MHz. However, as the experiment above showed, the invention allowed use of a 10-foot loop at 150 MHz.

4. The time-frequency of the standing wave SUM in FIGS. 5–13 equals that of the underlying traveling sine waves, provided the traveling sine waves are of identical frequency. To illustrate this frequency, the instantaneous values of one wave reaching detector D2 in FIG. 18 is given by the expression SIN(wt+$f_1$). For the other wave, the expression is SIN(wt+$f_2$). The terms $f_1$ and $f_2$ are phase delays. The total time for one wave to traverse the loop 60 is ($f_1$+$f_2$), which is a constant.

The following trigonometric identity will be used:

$$\text{SIN } x + \text{SIN } y = 2[\text{SIN } \tfrac{1}{2}(x+y)][\text{COS } \tfrac{1}{2}(x-y)].$$

Substituting the expressions of FIG. 18 into this identity produces:

$$\text{SIN}(wt+f_1) + \text{SIN}(wt+f_2) = 2[\text{SIN } \tfrac{1}{2}(wt+f_1+wt+f_2)][\text{COS } \tfrac{1}{2}(wt+f_1-wt-f_2)] = 2[\text{SIN } \tfrac{1}{2}(wt+f_1+wt+f_2)][\text{COS } \tfrac{1}{2}(f_1-f_2)]$$

The frequency of the last expression is w, the frequency of the individual sine waves.

5. The invention should not be confused with a square pulse traveling on a transmission line. A square pulse, as explained above, contains a base sinusoid and a series of harmonics. These frequencies will probably be reflected at various points in the transmission line. Thus, oppositely traveling waves will probably exist in the transmission line, which produce standing waves.

However, so many waves are involved, at so many different frequencies, that no useful standing wave of the type SUM in FIGS. 5–13 will exist. That is, because numerous standing waves will exist, at different frequencies, the node points N will be scattered everywhere, and the overall "standing wave" will be badly distorted.

The invention differs from the situation just described in several respects. One is that only a single sinusoid frequency is used, and is the same in both traveling waves. Another is that, if any harmonics are present, they are intentionally suppressed to be less than 10 percent of the magnitude of the basic sinusoids. This suppression can be taken, for example, by installing a filter F between the sine wave generator 55 and the loop 60 in FIG. 15.

6. The invention provides clock signals at two points, from a common source, with a delay between them which is less than the time required for a signal to travel along a transmission medium connecting the two points. The clock signals produced by the invention are absolutely synchronous, or substantially so. "Absolutely synchronous" means that no delay between corresponding clock signals exceeds 500 pico-seconds.

7. The tapping point P10 in FIG. 5 should not be close to a node N, because the swing in signal magnitude at N is too small. Preferably, point P10 is more than 20, 30, 45, or 60 degrees away, as desired, from the nearest node N, and should be at the 90-degree position, where the envelope of the standing wave is largest.

8. A unit of distance may be defined, analogous to a certain unit used in astronomy, namely, the "light year," which is the distance traveled by light, in vacuum, in one year. By analogy, Applicant defines a "light nanosecond" to be the distance traveled by light, in vacuum, in one nano-second. Since light travels 982,080,000 feet in one second, a light-nanosecond equals $982,080,000/10^9$, or 0.982 feet, or approximately one foot.

Under Einstein's theory of relativity, no signal can travel faster than the speed of light. Thus, if the taps for the two modules M1 and M2 in FIGS. 1 and 2 are separated by one light-nanosecond, the clock signals which they receive will not be simultaneous, and will lack simultaneity by at lease one nano-second.

However, if detectors D1 and D2 in FIG. 15 are separated by one light-nanosecond, or more, nevertheless, the clock signals which they receive will be simultaneous within 500 pico-seconds, which is one-half of one nano-second. Further, as the experiment described above showed, even with a separation of five feet, the clock signals are simultaneous within 500 pico-seconds. That is, a clock signal traveling at the speed of light would experience a delay of about 5 nano-seconds in traveling between the two detectors. But the invention allows clocking with a simultaneity of 500 pico-seconds. Numerous substitutions and modifications can be undertaken without departing from the true spirit and scope of the invention. What is desired to be secured by Letters Patent is the invention as defined in the following claims.

What is claimed is:

1. A system comprising:
   a) two transmission lines, each carrying a sinusoid;
   b) means for deriving an oscillating signal from the two sinusoids; and
   c) digital apparatus which is clocked by the oscillating signal.

2. A system comprising:
   a) two transmission lines;
   b) means for producing a sinusoidal signal on both transmission lines;
   c) means for tapping a signal from each transmission line;
   d) means for normalizing the tapped signals, so that the tapped signals represent sinusoids of similar amplitude; and
   e) means for adding the normalized tapped signals together.

3. System according to claim 2, and further comprising:
   f) digital apparatus for receiving the added signals, and using the added signals as a clock signal.

4. A system comprising:
   a) first and second transmission lines;
   b) means for producing first and second sinusoidal signals on the respective transmission lines;
   c) a first phase locked loop, coupled to the first sinusoidal signal, for generating a first output sinusoid which is in substantially constant phase relation with the first sinusoidal signal;
   d) a second phase locked loop, coupled to the second sinusoidal signal, for generating a second output sinusoid which is
      i) in substantially constant phase relation with the second sinusoidal signal;
      ii) of substantially the same peak-to-peak magnitude as the first output sinusoid; and
   e) means for adding the first and second output sinusoids together.

5. A digital apparatus, comprising:
   a) a transmission line having two entry ports;
   b) launching means for launching a sinusoidal signal into each entry port;
   c) suppression means for suppressing reflections of the sinusoidal signals within the transmission line; and d) taps, at a plurality of points along the transmission line, each for deriving a clock signal from a standing wave produced by the sinusoidal signals.

6. Apparatus according to claim 5, in which the sinusoids have a base component of frequency, and no harmonic components of magnitude greater than 10 percent of the base component.

7. Apparatus according to claim 5, in which the sinusoids are time-synchronous.

8. In a printed circuit board, the improvement comprising:
   a) digital circuits which require clock signals;
   b) an elongated conductive trace;
   c) means for generating a standing wave in said trace; and
   d) means for picking off clock signals at selected locations on said trace, and delivering said clock signals to said digital circuits.

9. Improvement according to claim 8, in which all clock signals delivered to said digital circuits are synchronous to within 1.0 nano-second.

10. Improvement according to claim 8, in which the conductive trace is more than 18 inches long.

11. System according to claim 1, wherein each sinusoid is less than 100 milli-volts, peak-to-peak.

12. System according to claim 1, wherein each sinusoid is less than 10 milli-volts, peak-to-peak.

13. System according to claim 1, wherein each sinusoid is less than 100 micro-volts, peak-to-peak.

14. System according to claim 1, wherein each sinusoid is less than 10 micro-volts, peak-to-peak.

15. System according to claim 2, wherein each sinusoidal signal is less than 100 milli-volts, peak-to-peak.

16. System according to claim 2, wherein each sinusoidal signal is less than 10 milli-volts, peak-to-peak.

17. System according to claim 2, wherein each sinusoidal signal is less than 100 micro-volts, peak-to-peak.

18. System according to claim 2, wherein each sinusoidal signal is less than 10 micro-volts, peak-to-peak.

* * * * *